(No Model.)
W. C. DABNEY.
DINNER PAIL.
No. 264,248. Patented Sept. 12, 1882.
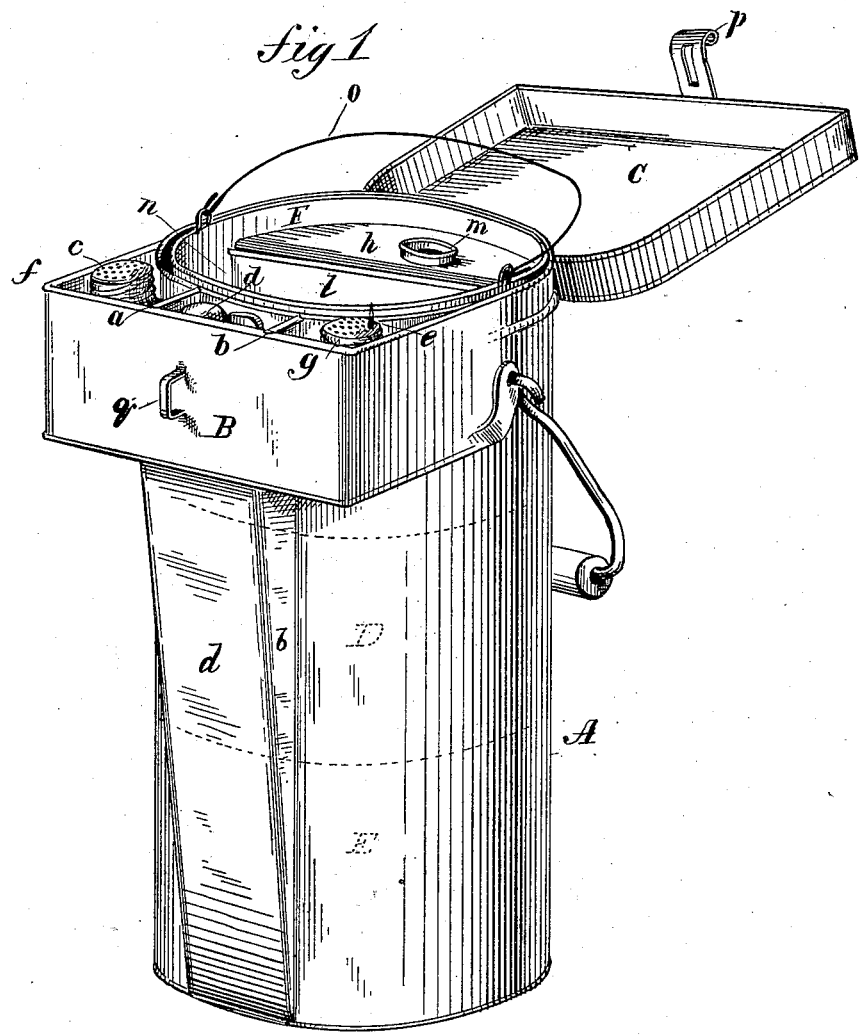
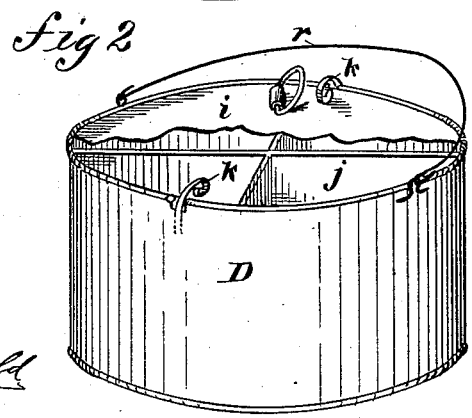
WITNESSES:
J. D. Garfield
C. Sedgwick
INVENTOR:
W. C. Dabney
BY Munn & Co.
ATTORNEYS.
N. PETERS. Photo-Lithographer, Washington, D. C.

UNITED STATES PATENT OFFICE.

WILLIAM C. DABNEY, OF PRINCETON, KENTUCKY.

DINNER-PAIL.

SPECIFICATION forming part of Letters Patent No. 264,248, dated September 12, 1882.

Application filed July 12, 1882. (No model.)

*To all whom it may concern:*

Be it known that I, WILLIAM C. DABNEY, of Princeton, in the county of Caldwell and State of Kentucky, have invented a new and Improved Dinner-Pail, of which the following is a full, clear, and exact description.

Reference is to be had to the accompanying drawings, forming part of this specification, in which similar letters of reference indicate corresponding parts in both the figures.

Figure 1 is a perspective view of my improved dinner-pail. Fig. 2 is a perspective view of one of the compartments of the pail, with parts broken away to show the inside arrangements of the same.

The object of my invention is to provide a dinner-pail adapted to the use of laboring people and travelers that is compact and of convenient form and peculiar construction, enabling the user to carry a great variety of food without danger of mixing one kind with another.

My invention consists of a pail having attached at one side to the top a rectangular extension for containing boxes for condiments, also a casing for receiving a knife, fork, and spoon, or other utensils. The pail is provided with three compartment food pails or sections fitted to its interior, and is also provided with a hinged cover that is secured over the pail by a locking device.

Referring to the drawings, A is a cylindrical pail, made of sheet metal or other suitable material, provided with a bail and having a rectangular extension or box, B, which is divided by partitions $a\ b$ into three compartments, $c\ d\ e$, the compartments $c\ e$ being shallow and adapted to receive the boxes $f\ g$ for salt, pepper, or other condiments. The partitions $a\ b$ extend downward below the box B to the bottom of the pail A, and are provided with a cover, forming the tapering compartment $d$ for containing a knife, fork, and spoon, or other utensils.

A close-fitting cover, C, is hinged to the back of the pail A, and when closed extends over the pail A and the box B, and is provided with a hasp, $p$, which passes over and engages with the loop $q$ on the front end of the box B, adapting the cover to be secured by a padlock.

The covered food-pail D is divided into compartments by partitions $j$, as shown in Fig. 2, and on top of the partitions rests a removable cover, $i$, which is held to its place by the springs $k$, that are firmly secured to the sides of the pail D. The pail D is also provided with a bail, $r$, by which it can be lifted from the pail A. The compartments formed by the partitions $j$ are for the purpose of carrying different kinds of vegetables and foods, and to keep each from mixing with the other.

The food-pail F, (shown in the upper end of pail A, Fig. 1,) is provided with a bail, $o$, and cover, (not shown,) and is divided by a partition, $l$, through its center. On one side of the partition is placed a canteen, $h$, (for the purpose of carrying liquids,) which has an opening, $m$, in its top, near its flat side, to receive a cork. The other half of the pail F may be used for carrying bread or other food.

The remaining food-pail, E, (shown in dotted lines, Fig. 1,) is precisely like pail D, as shown in Fig. 2, and heretofore described.

I do not limit or confine my invention to the precise form herein shown and described, as I may make the pail in other forms, either square or oval.

My invention has advantages over the dinner-pails in ordinary use, it being more cleanly, carrying so many kinds of food in separate inclosures so arranged that they cannot get mixed, and being provided with means for locking to insure the safety of the contents.

Having thus fully described my invention, I claim as new and desire to secure by Letters Patent—

1. In a food-carrying pail, the combination, with the pail A, of the pails D and E, having partitions $j$, cover $i$, and springs $k$, of the pail F, having a partition, $l$, canteen $h$, and apartment $n$, as described, and for the purpose set forth.

2. In a food-carrying pail, the combination, with the pail A, of the box B, having the partitions $a\ b$ and compartments $c\ e$ and the utensil-compartment $d$, as shown and described.

3. In a food-carrying pail, the combination, with the pail A and box B, of the cover C, as shown, and for the purpose described.

WILLIAM C. DABNEY.

Witnesses:
H. J. CARTER,
H. C. HERNDON.